Oct. 26, 1965 W. REID 3,213,655
WORKPIECE SHAPE CONTROL APPARATUS
Filed Dec. 3, 1962 2 Sheets-Sheet 1

INVENTOR
Warren Reid
BY *Brodahl*
ATTORNEY

Oct. 26, 1965  W. REID  3,213,655
WORKPIECE SHAPE CONTROL APPARATUS
Filed Dec. 3, 1962  2 Sheets-Sheet 2

United States Patent Office 3,213,655
Patented Oct. 26, 1965

3,213,655
WORKPIECE SHAPE CONTROL APPARATUS
Warren Reid, Forest Hills Boro, Pa., assignor to Westinghouse Electric Corporation, East Pittsburgh, Pa., a corporation of Pennsylvania
Filed Dec. 3, 1962, Ser. No. 241,646
4 Claims. (Cl. 72—11)

The present invention relates in general to a workpiece shape controlling method and apparatus and more particularly to workpiece shape or thickness control method and apparatus operative with a workpiece rolling mill or the like.

It has been known in the prior art to control the operation of a workpiece rolling mill, for continuous hot and cold mills in both the steel and non-ferrous industry areas, by the use of a single workpiece thickness measuring gauge positioned after a particular stand of the mill with the output of this gauge being used to control various operative factors in the control process, such as the strip tension, screwdown setting or mill speed for the purpose of minimizing workpiece thickness deviations at this point of measurement. This single gauge has been positioned such that it measured the workpiece thickness at a location which is equally distant from the respective edges of the workpiece passing through the mill. In actual practice there has still resulted various undesired workpiece profiles taken in a plane transverse to the longitudinal movement of the workpiece. More specifically, the thickness at the center of the workpiece could be as desired, however, the thickness at other points across the width of the material could deviate to the extent that the delivery product would have to be scrapped.

It is an object of the present invention to provide an improved workpiece thickness control apparatus operative such that the thickness deviations taken across the profile of the delivery workpiece are minimized.

It is another object of the present invention to provide improved shape control apparatus for operation with a workpiece rolling mill to better control the final delivery shape and cross-sectional thickness of the rolled product relative to a desired shape and cross-sectional thickness.

It is a different object to provide improved shape or thickness control apparatus for better controlling the operation of a workpiece rolling mill such that the delivery workpiece thickness is more closely in accordance with a desired workpiece thickness and the cross-sectional profile is more in accordance to a desired workpiece profile or shape and the thickness deviations across this profile are within desired limits.

In accordance with the present invention, improved shape or thickness control apparatus is provided for better controlling the operation of a workpiece rolling mill such that the rolls are better maintained in a level position and the roll contour is controlled to provide a desired workpiece delivery thickness and profile. Workpiece thickness sensing devices can be located as desired to measure both the right edge of the workpiece and the left edge of the workpiece, with the outputs of the two thickness sensing devices being amplified and operative such that any thickness or shape deviations result in a corrective action to level the roll members and cause the two sides of the workpiece as delivered from the mill to have the same thickness. In addition, a normal or conventional automatic gauge control operation is provided to correct for thickness errors which occur across the whole of the delivered workpiece. In this regard, the present invention includes both corrective action taken by adjustment of screwdown control apparatus and in addition includes corrective action by changing the contour or shape of the roll member itself.

These and other objects and advantages of the present invention will become apparent in view of the following description taken in conjunction with the drawings wherein.

Figure 1:
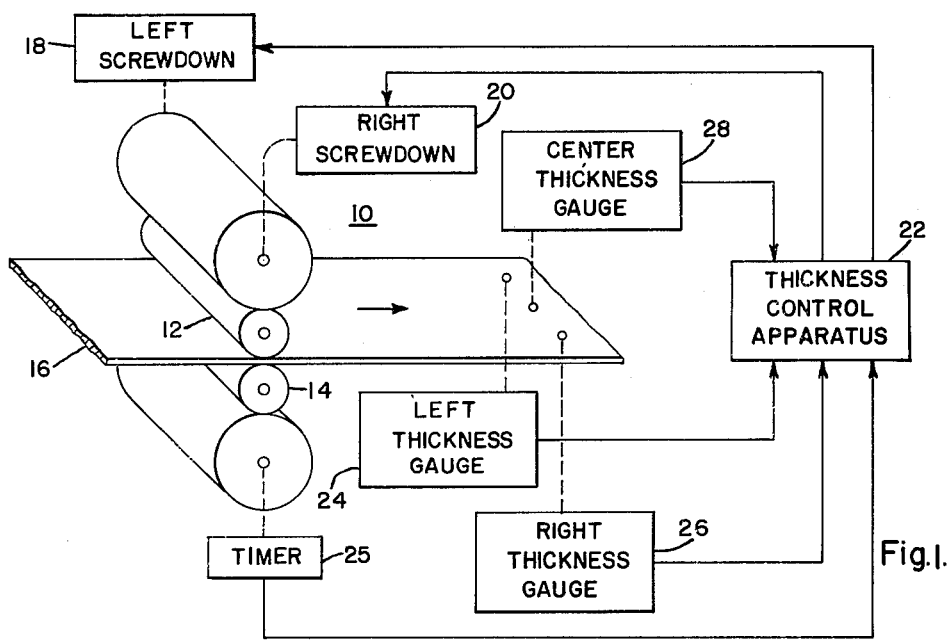
FIGURE 1 is a diagrammatic showing of the present control apparatus.

In FIG. 1, there is shown a workpiece rolling mill 10 including an upper roll 12 and a lower roll 14 operative with a workpiece or strip 16 for determining the final or delivery thickness and profile of that workpiece or strip 16. In this regard, a left screwdown mechanism 18 is provided to increase or decrease the effective pressure between the upper roll 12 and the lower roll 14 relative to the left edge of the workpiece 16. A right screwdown mechanism 20 is similarly provided to increase or decrease the effective pressure between the upper roll 12 and the lower roll 14 relative to the right edge of the workpiece 16. There is provided a thickness control apparatus 22 operative to energize one or the other as may be desired of the left screwdown mechanism 18 and the right screwdown mechanism 20 for the purpose of correcting any undesired thickness or shape deviation of the workpiece 16 delivered from the rolling mill 10. A left thickness gauge 24 is provided to measure the actual thickness of the left side of the workpiece 16 relative to a desired reference thickness and to provide an error signal to the thickness control apparatus 22 for the purpose of correcting any thickness or shape errors in the left side of the workpiece 16 delivered from the rolling mill 10. A right thickness gauge 26 is similarly operative to measure the actual thickness of the workpiece 16 delivered from the rolling mill 10 at the right edge thereof and to provide an error signal when this actual thickness is compared to a desired or reference workpiece thickness, which error signal is utilized by the thickness control apparatus 22 for the purpose of correcting any undesired thickness error at the right side of workpiece 16. A center thickness gauge 28 is operative relative to a desired center workpiece thickness for measuring the actual thickness of the center of the workpiece 16 delivered from rolling mill 10 and to provide an error signal to the thickness control apparatus 22 for the purpose of correcting any undesired error in the center of the workpiece 16. It should be noted that after the rolling mill is level, which means that the upper roll 12 is substantially parallel to the lower roll 14 resulting in the same thickness being delivered from the rolling mill 10 at both the left edge of the workpiece 16 and the right edge of the workpiece 16, the center thickness gauge 28 is then operative as a conventional automatic gauge control sensing device for the purpose of simultaneously energizing both the left screwdown mechanism 18 and the right screwdown mechanism 20 for the purpose of maintaining a desired or reference delivery thickness from the rolling mill 10.

Figure 2:
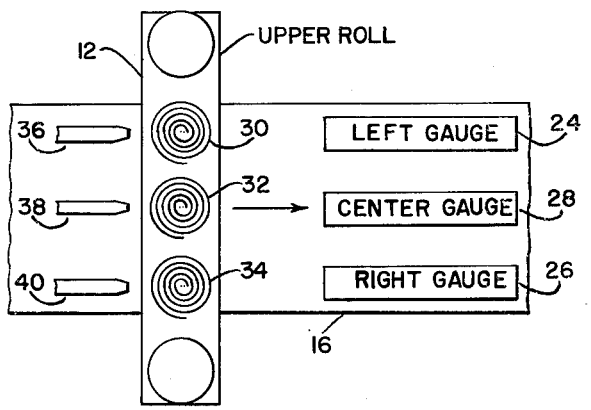
FIG. 2 is a plan view of a rolling mill illustrating the position of the workpiece thickness sensing devices and the position of roll member contour corrective means.

In FIG. 2, there is shown the upper roll 12 and the workpiece 16, with the left thickness gauge 24 and the center thickness gauge 28 being shown positioned relative to the right thickness gauge 26. In addition, in FIG. 2, there are shown a plurality of roll heating devices such as the inductor coils 30, 32 and 34 for the purpose of thermally controlling and correcting any undesired contour shape of the upper roll 12. Similarly there is provided roll cooling means in the form of controlled temperature quench fluid nozzles 36, 38 and 40 provided to cool predetermined portions of the upper roll 12 to similarly correct for undesired contour errors of the upper roll 12. The lower roll 14 can be similarly heated and cooled as may be desired.

In FIG. 3A there is shown a first profile for the workpiece 16 which would be delivered from a properly level rolling mill 10. There is shown in FIG. 3B an undesired profile wherein the right side of the delivered workpiece is too thick as compared to the left side of the delivered workpiece, such that the right screwdown mechanism 20 should be energized to increase the roll pressure between the upper roll 12 and the lower roll 14 and the left screwdown mechanism 18 should be energized to decrease the resulting roll force at the left side of the rolling mill 10. In FIG. 3C, there is shown a delivery work profile where the left side of the workpiece is too large and the right side might be too thin such that there should be a correction made by energizing the left screwdown mechanism 18 to increase the roll pressure at the left side of the rolling mill 10 and the right screwdown mechanism 20 should be energized to decrease the roll pressure at the right edge of the rolling mill 10. In FIG. 3D, there is shown a delivery workpiece profile wherein both the left screwdown mechanism 18 and the right screwdown mechanism 20 should be energized to increase the roll force at respectively the left and right sides of the rolling mill 10 and, in addition, the roll member cooling device 38 could be energized to cool and thereby contract the center of the upper roll 12 and the roll heating device 30 and 34 could be operated to increase the temperature and thereby enlarge the sides of the upper roll 12. In FIG. 3E, there is shown a delivery workpiece profile wherein the left screwdown mechanism 18 and the right screwdown mechanism 20 should be energized to decease the roll pressure at respectively the left and right sides of the rolling mill 10 and the roll cooling devices 36 and 40 could be energized if desired to decrease the dimensions of the upper roll 12 at respectively the left and right side of the rolling mill and the roll heating device 32 could be operated to increase the temperature of the central portion of the upper roll 12.

Figure 4:
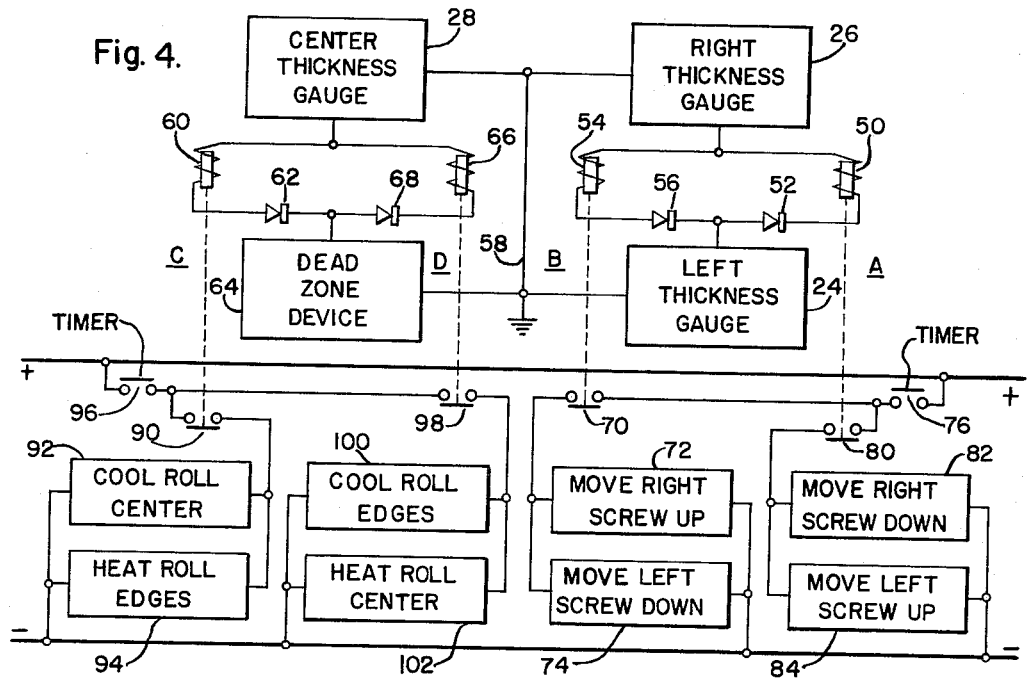
FIG. 4 is a schematic showing of one embodiment of the control apparatus in accordance with the teachings of the present invention.

In FIG. 4, there is shown the left thickness gauge 24, the right thickness gauge 26 and the center thickness gauge 28 operative with a plurality of control relays for determining the operation of the screwdown mechanisms and the roll heating and roll cooling devices. The right thickness gauge 26 is connected through a bridge circuit including a first relay coil 50 serially connected with a diode member 52 for conducting in a direction from the left thickness gauge 24 to the right thickness gauge 26. A relay operating coil 54 is serially connected with a diode member 56 to be conductive in a direction from the right thickness gauge 26 to the left thickness gauge 24. A suitable ground connection 58 is provided to complete the circuit. The center thickness gauge 28 is connected through a relay coil 60 and a diode 62 to be conductive from the center thickness gauge through a dead zone device 64 toward the ground connection 58. The center thckness gauge 28 is also connected through a relay coil 66 and a diode member 68 to be conductive through the dead zone device 64 from ground potential toward the center thickness gauge 28.

The relay coils are operative with relay contacts as shown in FIG. 4 such that with the workpiece delivery profile as shown in FIG. 3C when the right thickness gauge 26 provides an output signal having a positive polarity to indicate a too thin workpiece right edge and the left thickness gauge 24 provides an output signal having a negative polarity to indicate a too thick workpiece left edge the relay coil 54 is energized to close a contact 70 operative with the relay coil 54 to energize in an upward direction the up control winding 72 of the right screwdown mechanism 20 and the down control winding 74 of the left screwdown mechanism 18 when a timer contact 76 is closed in accordance with the rolling mill speed by the timer 25 shown in FIG. 1. This would correct the workpiece profile shown in FIG. 3C.

When the left thickness gauge 24 provides a positive polarity error signal and the right thickness gauge 26 provides a negative polarity error signal for a workpiece delivery profile as shown in FIG. 3B, the relay coil 50 is energized to close the associated contact 80 for energizing the control winding 82 for moving down the right screwdown mechanism 20 and for energizing the control winding 84 for moving up the left screwdown mechanism 18 when the timer contact 76 is closed. This would correct the workpiece profile shown in FIGURE 3B.

When the center thickness gauge provides a positive polarity output signal to indicate that the delivery thickness at the center portion of the workpiece is too thin compared to a desired thickness, such as shown in FIG. 3D, the relay coil 60 is energized to close the contact 90 to energize the control winding 92 for the roll cooling device 38. At the same time, the control winding 94 is energized to operate the roll heating devices 30 and 34, when the timer contact 96 associated with the timer 25 shown in FIG. 1 is closed.

When the center thickness gauge 28 provides a negative polarity output signal to indicate that the center portion of the delivered workpiece is too thick compared to a desired workpiece thickness such as shown in FIG. 3E, the associated contact 98 operative with the relay coil 66 is closed to in turn energize a control winding 100 operative with the roll cooling devices 36 and 40 and to energize a control winding 102 operative with the roll heating device 32 as shown in FIG. 2.

Figure 5:
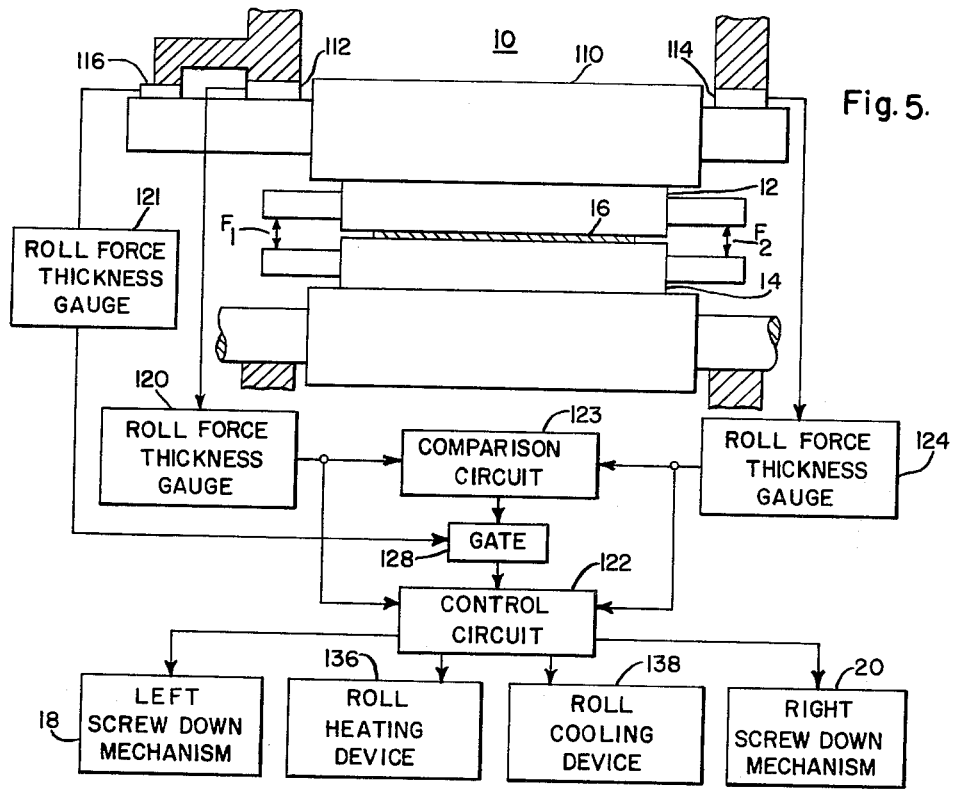
FIG. 5 shows a modification of the present control apparatus operative with roll force sensing devices.

In FIG. 5, there is shown a modification of the present control apparatus. The upper roll 12 and the lower roll 14 are shown operative with a workpiece 16. The upper back-up roll 110 is provided with a left side roll force sensing device 112 and a right side roll force sensing device 114 if the rolls 12 and 14 are viewed from the delivery side of the rolling mill 10. In addition, the back-up roll 110 is provided with an axial extension which in turn is operative with at least one roll force sensing device 116 for sensing any bending of the roll 110. The output signal from the left side roll force sensing device 112 is provided to a roll force thickness gauge 120 operative to provide a thickness error signal relative to a desired roll force thickness for the left side in accordance with the well known mill spring formula $$H = S + \frac{F}{M}$$

where H is the delivery workpiece thickness, S is the screwdown setting, F is the actual roll force and M is the predetermined mill spring constant for the particular mill under consideration. The values for the screwdown setting S and the effective mill spring constant M are suitably provided for each of the roll force thickness gauges as already well known to persons skilled in this particular art. This error signal from the roll force thickness gauge 120 is supplied to a comparison control circuit 122. Similarly, the roll force sensing device 114 provides an actual roll force signal to a roll force thickness gauge 124 which is operative in accordance with the well known mill spring formula to measure any thickness error in the right side of the workpiece delivered from the milling roll and provide a thickness error signal to the comparison control circuit 122. In this regard, the control circuit 122 could be a pair of magnetic amplifier devices with a first such device being operative to control the energization of the left screwdown mechanism 18 and the second magnetic amplifier device being operative to control the operation of the right screwdown mechanism 20.

In this respect, the left side thickness error signal from the roll force thickness gauge 120 could be operative to so control the respective screwdown mechanisms such that when the left side delivery thickness is too great the right screwdown mechanism is energized to decrease the roll force at the right side of the rolling mill and the left screwdown mechanism is energized to increase the roll force at the left side of the rolling mill. Similarly, the thickness error signal from the roll force thickness gauge 124 could be operative with each of these magnetic amplifier devices such that when the delivery thickness at the right side of the mill is too great the left screwdown mechanism 18 is operated to decrease the roll force between the upper roll 12 and the lower roll 14 at the left side of the rolling mill and the right screwdown mechanism is operated to increase the roll force at the right side of the rolling mill. The force transducer 116 is provided to sense any bending of the upper back-up roll 110 and is operative with the control circuit 122 through a gate device 128 such that only when the delivery workpiece thickness at the left side of the rolling mill and the delivery thickness at the right side of the rolling mill are substantially equal and the same is the gate device 128 open to permit the force signal from the transducer 118 to be supplied to the comparison circuit 122. This may be accomplished with a simple and well known signal difference or comparison circuit 123, wherein the right side thickness error signal supplied by the roll force thickness gauge 124 energizes a first input and the thickness error signal from the left side roll force thickness gauge 120 energized a second input, and only when the latter two signals are substantially the same is an output signal provided to open the gate 128 to allow the error signal from the roll force thickness gauge 121 to be supplied to the magnetic amplifier devices of the control circuit 122. The comparison circuit 122 may also include a magnetic amplifier device connected to operate the respective roll heating devices as may be desired and similarly a magnetic amplifier device could be provided to energize the respective roll cooling devices as may be desired. In this respect, it may be preferable that the roll heating device 136 and the roll cooling device 138 be operated only when the roll force thickness gauges 120 and 124 indicate that the delivery thickness of the workpiece 16 at each of the left side of the rolling mill and the right side of the rolling mill are substantially the same and the mill is level.

In the operation of the present control apparatus and with particular reference to the modification shown in FIG. 4, leveling of the rolling mill requires a thickness gauge located on both the left side of the workpiece 16 and the right side of the workpiece 16. The outputs of the two thickness gauges are combined such that with equal thickness of the strip on each of the left and right sides of the rolling mill, the outputs of the right thickness gauge 26 and the left thickness gauge 24 are substantially equal and there would be no resulting current flow through either of the relay coils 50 and 54. However with any unequal thickness, the output from the gauge measuring the thinner side would predominate and cause the desired relay coil to be energized to result in a screwdown movement to bring the two sides of the strip delivered from the rolling mill to substantially the same thickness.

The sequence timer 25 shown in FIG. 1 is operative to open and close the contacts 76 and 96 to compensate for the required transport time delay between the rolls where actual corrections are being made in the thickness of the delivered strip and the thickness gauges 24, 26 and 28 where the measurement is being made. In addition, it may be desired that the mill leveling operation provided by the present control apparatus not interfere with the normal automatic gauge control operation and therefore the timer contacts 76 and 96 would provide a desired sampling operation in this respect.

After the rolling mill is leveled, the output from either the right thickness gauge 26 or the left thickness gauge 24 is balanced by the output from the other thickness gauge. In the operation of the center thickness gauge 28, if no current flows through either of the relay coils 60 and 66, it indicates that the delivery thickness of the workpiece is the same at the center of the workpiece as the desired reference thickness. It should be noted that the dead zone device 64 is provided to limit the operation of the relay coils 60 and 66 in that the greater number of corrections will be accomplished by leveling of the rolling mill and the operation of the center thickness gauge 28 to control the relay coils 60 and 66 will be provided only for the more extreme variations in the contour of the roll members. In addition, the operation of the roll heating devices and the roll cooling devices will require considerable time and it might be desired that the timer contact 96 be closed for an increased time period to compensate over the required time lagging the operation of the roll heating devices and the roll cooling devices.

It should be understood that the present invention is not limited to the use of three thickness gauges as shown in FIG. 1. Instead, a greater or lesser number of gauges could be used to obtain a suitable and desired measurement of the delivery profile of the workpiece or if desired a single thickness gauge could be operative and provided with a mechanical support member which would traverse across the workpiece and be operative through an electrical sequencing mechanism such that thickness measurements could be made as desired at any interim points.

Regarding the cooling and heating of the rolls, it is intended that any practical device or method for effecting the heat content or thermal expansion and contraction of the rolls is included such as open flames or induction heating and similarly the cooling of the portions of the roll can be accomplished with any suitable apparatus such as a controlled temperature fluid quench or the like.

Figure 3:
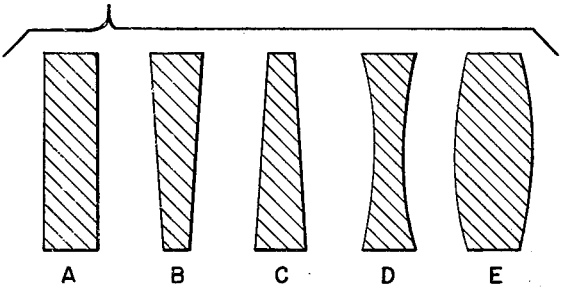
FIG. 3 illustrates some typical workpiece delivery profiles which might be corrected with the present control apparatus.

With reference to the workpiece profiles shown in FIG. 3, the profile shown in FIG. 3A is a uniform profile and if it were the final delivered product no adjustment would be required since a substantially flat product on gauge material is being delivered. In the profile shown in FIG. 3B, the left side of the delivery material is thinner and might undergo greater elongation to introduce ripples in the sheet if the sheet were thin enough and would become more pronounced near the left edge of the sheet. The desired corrective action would be to lower the right screwdown mechanism 20 and to raise the left screwdown mechanism 18. The profile shown in FIG. 3C represents the reverse of the profile shown in FIG. 3B, and might result in ripples on the right side of the strip. The desired corrective action would be the lowering of the left screwdown mechanism 18 and raising the right screwdown mechanism 20. With the profile shown in FIG. 3D there might appear ripples near the center of the workpiece or strip. Here a choice of corrective actions can be provided for the purpose of reducing the crown effect of the rolls. If the thickness deviation is too great, it might be desired to indicate that a different roll member having a smaller crown should be provided or in the operation of a multistand rolling mill it might be desirable to rearrange the rolling schedules of the respective stands to take a higher draft in the particular stand under consideration to thereby increase the roll force at each of the left side and the right side of the rolling mill to cause greater roll deflection and flattening and thereby to give the same effect of reducing the roll crown. Another corrective action could be to cool the roll in the center such that roll crown would be less expanded due to thermal reasons. The profile shown in FIG. 3E is substantially the opposite of that shown in FIG. 3D, and might result in ripples in the delivery strip near the edges of the strip. The desired corrective action would be to possibly change the rolls or rearrange the rolling schedule for less draft in the stand under consideration. Another alternative might be to use less roll coolant in the center portion and perhaps heat the center portion of the roll.

It is within the scope of this invention to apply a bending force to the extended ends of the upper roll 12 and the lower roll 14 to correct the delivery profiles shown in FIG. 3D and in FIG. 3E. The separation forces $F_1$ and $F_2$ shown in FIG. 5 could be applied to the extended ends of rolls 12 and 14 by a force producing device to correct the FIG. 3E profile, for example. The reverse application of bending forces would correct the delivery workpiece profile shown in FIG. 3D. Thusly, increasing the separation forces $F_1$ and $F_2$ would be equivalent in effect to heating the roll center and cooling the roll edges only would not require the relatively long time lag period.

Although the present invention has been described with a certain degree of particularity, it should be understood that the present disclosure has been made only by way of example and that numerous changes in the details of construction and the combination and arrangement of parts may be resorted to without departing from the scope and spirit of the present invention.

I claim as my invention:

1. In workpiece shape control apparatus operative with a rolling mill having at least one roll and a left screwdown means and a right screwdown means, the combination of first workpiece shape sensing means for providing a first control signal in accordance with the shape error of said workpiece at a first predetermined location relative to said mill, second workpiece shape sensing means for providing a second control signal in accordance with the shape error of said workpiece at a second predetermined location relative to said mill, roll shape sensing means for providing a third control signal in accordance with the bending of said one roll, first control means operative with at least one of said left screwdown means and said right screwdown means and responsive to said first control signal for correcting the shape error at said first location, and second control means operative with at least the other of said left screwdown means and said right screwdown means and responsive to said second control signal for correcting the shape error at said second location, and third control means responsive to said third control signal upon the occurrence of a predetermined relationship between said first control signal and said second control signal for correcting the shape error of said workpiece.

2. In workpiece thickness control apparatus operative with a strip rolling mill having a work roll and a left side screwdown means and a right side screwdown means, the combination of first strip thickness sensing means for providing a first error signal in accordance with a first thickness error of said strip relative to the left side of said mill, second strip thickness sensing means for providing a second error signal in accordance with a second thickness error of said strip relative to the right side of said mill, roll shape sensing means for providing a third error signal in accordance with the bending of said work roll, first thickness control means operative with said left side screwdown means and responsive to said first error signal for correcting said first thickness error, and second thickness control means operative with said right side screwdown means and responsive to said second error signal for correcting said second thickness error, and third thickness control means responsive to the first error signal being substantially the same as the second error signal for allowing the third error signal to effect a correction of the workpiece thickness.

3. In workpiece thickness control apparatus operative with a rolling mill having a work roll, a first profile control means and a second profile control means, the combination of thickness sensing means for providing a first error signal in accordance with the thickness error of said workpiece at a first predetermined location, a second error signal in accordance with the thickness error of said workpiece at a second predetermined location and a third error signal in accordance with the thickness error of said workpiece at a third predetermined location, first thickness correction means operative with said first profile control means and responsive to said first error signal and said second error signal for correcting the thickness error at said first location, second thickness correction means operative with said second profile control means and responsive to said first error signal and said second error signal for correcting the thickness error at said second location, and third thickness correction means responsive to said third error signal upon said first error signal being substantially equal to said second error signal for the purpose of correcting the thickness error of said workpiece at said third location.

4. In workpiece shape control apparatus operative with a rolling mill having a roll member and including a left screwdown means and a right screwdown means, the combination of first workpiece shape responsive means for providing a first control signal in accordance with the workpiece shape error at a first edge of said workpiece, second workpiece shape responsive means for providing a second control signal in accordance with the workpiece shape error at a second edge of said workpiece, first control means operative with one of said left screwdown means and said right screwdown means and responsive to said first control signal for correcting the shape error at said first workpiece edge, second control means operative with the other of said left screwdown means and said right screwdown means and responsive to said second control signal for correcting the shape error at said second workpiece edge, third shape responsive means operative with said roll member for providing a third control signal in accordance with the actual shape of said roll member, and roll member shape control means responsive to said third control signal for correcting any undesired shape of said roll member.

References Cited by the Examiner

UNITED STATES PATENTS

| | | | |
|---|---|---|---|
| 2,289,410 | 7/42 | Dahlstrom | 80—56.2 |
| 2,319,309 | 5/43 | Emigh | 80—41 |
| 2,792,730 | 5/57 | Cozzo | 80—56.2 |
| 3,006,225 | 10/61 | Mamas. | |
| 3,016,460 | 1/62 | Andresen | 18—2 |
| 3,062,078 | 11/62 | Hulls | 80—56.2 |
| 3,078,747 | 2/63 | Pearson | 80—56.2 |

CHARLES W. LANHAM, *Primary Examiner.*

ROBERT F. WHITE, WILLIAM J. STEPHENSON,
*Examiners.*